(No Model.)
A. A. RUSSELL.
SINK STRAINER.
No. 597,482. Patented Jan. 18, 1898.
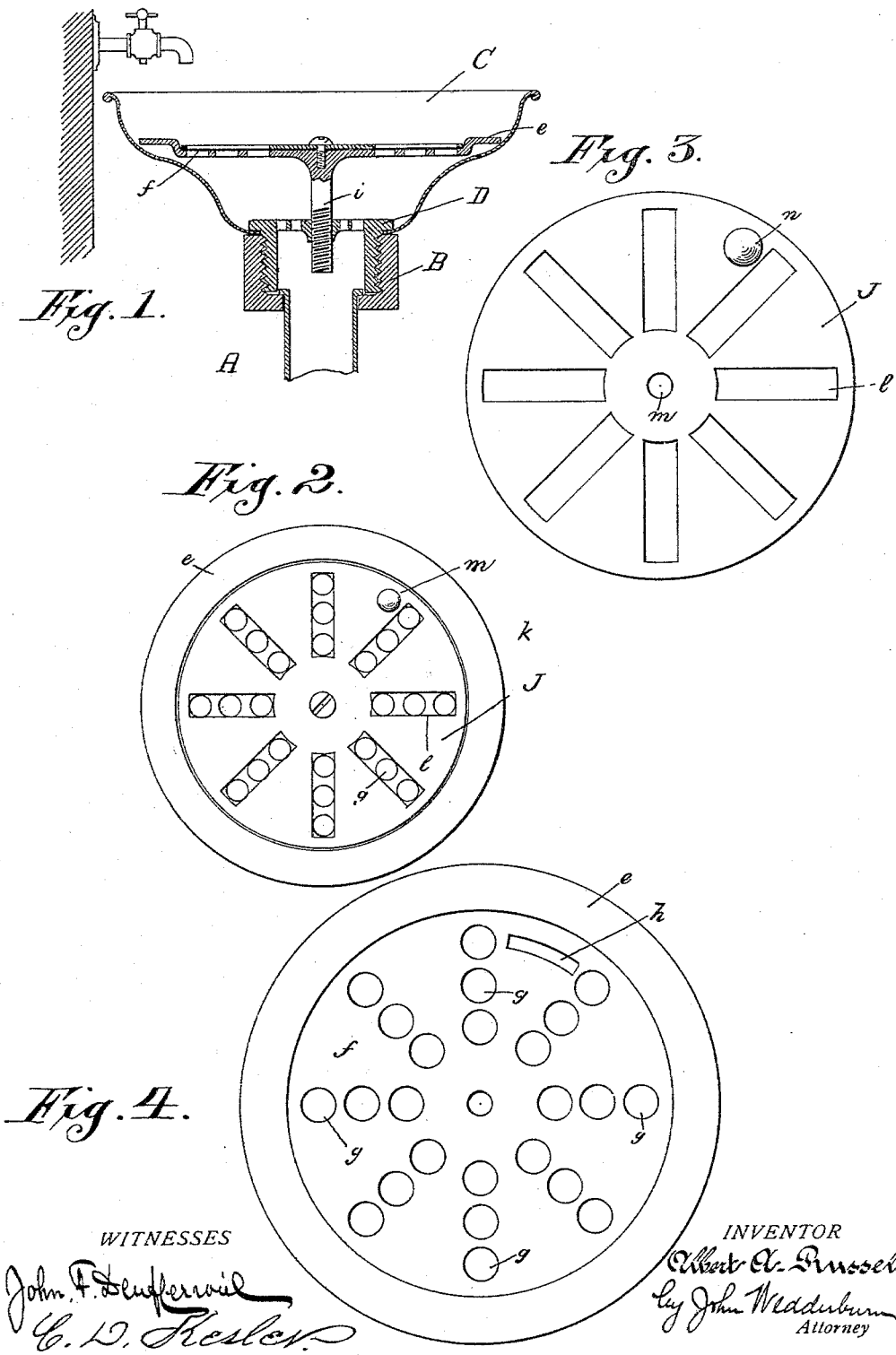

UNITED STATES PATENT OFFICE.

ALBERT A. RUSSELL, OF GRASS VALLEY, CALIFORNIA.

SINK-STRAINER.

SPECIFICATION forming part of Letters Patent No. 597,482, dated January 18, 1898.

Application filed January 7, 1897. Serial No. 618,377. (No model.)

*To all whom it may concern:*

Be it known that I, ALBERT A. RUSSELL, a citizen of the United States, residing at Grass Valley, in the county of Nevada and State of California, have invented certain new and useful Improvements in Sink-Strainers; and I do hereby declare the following to be a full, clear, and exact description of the invention, such as will enable others skilled in the art to which it appertains to make and use the same.

My invention relates to certain new and useful improvements in attachments for kitchen-sinks, the object being to provide a combination strainer and plug therefor whereby the sink may be more conveniently employed for washing dishes and other articles.

My invention consists of a strainer-plate adapted to be applied to the sink and provided with holes or openings for drainage, an adjustable plug also provided with drainage slots or openings and adapted to be turned so as to bring its slots into or out of coincidence with the said openings in the strainer-plate, whereby the sink may be drained off or plugged up to hold water, as desired, and means for moving said plug.

My invention also consists in certain other novel constructions, combinations, and arrangements of parts, as will be hereinafter more fully described, and set forth in the appended claim.

In the accompanying drawings, Figure 1 shows a vertical sectional view of a sink and my invention applied thereto. Fig. 2 is a top or plan view of the strainer-and-plug attachment removed from the sink. Fig. 3 is an enlarged plan view of the strainer-plate. Fig. 4 is a similar view of the plug-disk or cut-off.

Referring to the drawings, the letter A designates the stand-pipe or waste-pipe of the sink; B, the screw-collar thereon; C, the sink-basin, and D the perforated strainer at the bottom thereof.

My invention comprises a circular auxiliary strainer-plate having a rim edge $e$ and a countersunk or depressed center $f$, provided at short intervals around it adjoining said rim with a series of radial holes or openings $g$ and a segmental slot $h$ between two of said series. The depressed center has a screw $i$ projecting from the bottom thereof, which screws into a threaded opening in the perforated trap of the basin and thereby secures the strainer-plate to the sink.

A cut-off plug or disk J is of a size to snugly yet loosely fit within the depressed center of the strainer-plate, and is pivoted thereto by a screw $k$, which enters a threaded aperture therein. This plug has a series of radial slots $l$ and a threaded hole $m$, into which a screw-knob $n$ is screwed, and the lower end of the shank of this knob fits loosely within the segmental slot $h$. By means of this knob the cut-off plug or disk may be turned to bring its radial slots into coincidence with the radial openings in the strainer-plate when it is desired to discharge the contents of the sink or moved out of coincidence therewith in order that the sink may hold water for dishwashing or other purposes.

My invention is simple and cheap in construction and provides an efficient device which enables the sink to be used as a reservoir for washing dishes or other articles.

Having thus described my invention, what I claim as new, and desire to secure by Letters Patent, is—

In a sink, a waste-pipe, an interiorly-screw-threaded collar connected therewith, a sink-basin mounted thereon, a perforated strainer provided with a threaded pendent flange engaging the collar and clamping the sink thereon and provided with a threaded opening at the center thereof, an auxiliary strainer-plate provided with a depressed center having radial holes or openings, a screw formed integrally with and projecting from the bottom of the plate and engaging the said threaded opening in the strainer, and a cut-off plug or disk pivoted in the said depressed center of the auxiliary strainer-plate and having radial openings and provided with a slot-and-stop-connection with the said strainer-plate, substantially as described.

In testimony whereof I have signed this specification in the presence of two subscribing witnesses.

ALBERT A. RUSSELL.

Witnesses:
JOHN F. HUSS,
JNO. GLASSON.